United States Patent Office 3,143,475
Patented Aug. 4, 1964

3,143,475
VITAMIN-CONTAINING GELATIN BEADLETS
AND THE PROCESS OF PREPARING THEM
Arnold Koff, West Orange, and Peter Fredrick Widmer,
Allendale, N.J., assignors to Hoffmann-La Roche Inc.,
Nutley, N.J., a corporation of New Jersey
No Drawing. Filed Jan. 23, 1961, Ser. No. 83,891
16 Claims. (Cl. 167—81)

This invention relates to an improved process for the preparation of beadlets containing fat-soluble vitamin-active material. In particular, the invention relates to a process whereby an emulsion of fat-soluble vitamin-active material in water is formed into droplets and the droplets introduced into a vegetable oil to form gelatin beadlets having the fat-soluble vitamin-active material contained therein.

The process of the invention is carried out by forming an emulsion of (a) a fat-soluble vitamin-active material, (b) water, (c) type A gelatin, (d) totally invert sugar, (e) a water-soluble antioxidant, and (f) an oil-soluble antioxidant; converting the emulsion to droplets; collecting the individual droplets in a vegetable oil in such a manner that the vitamin-active particles formed from the droplets are kept separated from each other until their particulate form is permanently established; and separating the resulting vitamin-active beadlets from the vegetable oil.

Among the fat-soluble vitamin-active materials which can be used in practicing this invention are vitamin-bearing oils, provitamins, and pure or substantially pure vitamins, both natural and synthetic, or chemical derivatives thereof; crudes containing such substances; and mixtures thereof. This invention is particularly directed to the preparation of free-flowing powders containing vitamin A-active materials, more particularly vitamin A palmitate, but it should be understood that the invention comprehends also the preparation of beadlets containing any fat-soluble vitamin-active material, e.g., vitamins D, E, K, carotene, and the like, or mixtures of such materials, when prepared according to a process disclosed and claimed herein. The invention also relates to beadlets having the compositions herein disclosed.

The gelatin used in the process of the invention is gelatin known to the art as "type A" gelatin. Type A gelatin is gelatin prepared from animal skins and/or bones which have been pretreated with acid prior to extraction of the gelatin with hot water. Type A gelatin has an isoelectric point of about pH 7.0 to about 8.3. It has also been found that high bloom type A gelatin should be employed, i.e., gelatin having a bloom in the range of about 100 to about 300, preferably about 200 to about 300.

It has further been found that the sugar used in forming the emulsion should be totally invert sugar, i.e., a mixture of about 50% d-fructose and 50% d-glucose.

The water-soluble antioxidant used in the emulsion is a pharmaceutically acceptable antioxidant, preferably sodium meta bisulfite, although other antioxidants such as sodium bisulfite, sodium formaldehyde sulfoxalate, ascorbic acid, erythorbic acid, etc., can be used.

The oil-soluble antioxidant used in the emulsion is a pharmaceutically acceptable antioxidant such as one or more of the following: butylated hydroxy-anisole (2,6-di-t-butyl-4-methoxyphenol), butylated hydroxy - toluene (2,6-di-t-butyl-4-methylphenol), mixed tocopherols, propyl gallate, and the like, with butylated hydroxy-anisole and/or butylated hydroxy-toluene preferred.

The percentages given in the specification are percentages by weight.

The amounts of the above ingredients used to form the emulsion are not critical although from about 10 to about 40% of fat-soluble vitamin-active material, from about 40 to about 60% of type A gelatin, from about 10 to about 30% of totally invert sugar, from about 0.5 to about 4% of water-soluble antioxidant, and from about 1 to about 6% of oil- soluble anti-oxidant are generally employed. The quantity of vitamin-active material used depends on the formulation desired. The quantity of vitamin A-active material normally employed is sufficient to produce beadlets containing from about 200,000 to about 650,000 I.U. per gram, preferably from about 500,000 to about 600,000 I.U. per gram, based on the total weight of the beadlets.

The quantity of water used in forming the emulsion is sufficient to produce an emulsion having a viscosity in the range of about 240 to about 340 c.p.s. Generally, from about 40 to about 75% water, based on the total weight of emulsion is employed.

The particle size of the dispersed oil particles in the emulsion are maintained in the range of from about 0.5 to about 10 microns with only an occasional smaller or larger particle size.

The preparation of the vitamin-containing emulsion can be effected by methods which will be apparent to those skilled in the art. The following is an example of a method which has been found to be satisfactory: The gelatin is dissolved in water with the aid of moderate heating, and the vitamin-active substance is then dispersed or emulsified in the solution of the gelatin. The sugar, as well as any adjuvants, can be introduced into the mixture either before or after adding the vitamin-active material. The mixture is agitated until all dispersoids are uniformly distributed; if necessary, by passing the mixture through a homogenizer.

Additional ingredient including emulsifiers such as lecithin; extenders and solubilizers, such as sesame oil, peanut oil, cottonseed oil and the like; odor-imparting agents; colors; and other adjuvants conventionally used in pharmaceutical formulations can optionally be incorporated in the emulsions of this invention.

The vegetable oil used to catch the emulsion droplets is preferably castor oil although other vegetable oils such as corn oil, soya-bean oil, or sesame oil can be employed, although these are not as desirable as castor oil.

The introduction of droplets of the vitamin-containing emulsion into the vegetable oil is effected by ejecting the emulsion from a moving or fixed nozzle upon a stationary layer of vegetable oil at such a spaced interval that the droplets do not run together. Alternatively, the vegetable oil is presented as a moving layer, i.e., stirred below a fixed nozzle adjusted to let the droplets fall at a rate such that the droplets do not run together in the vegetable oil. The vegetable oil must be kept at a temperature between about 15 and about 25° C., preferably about 18 to about 22° C. in order to obtain symmetrical spheres of substantially constant diameter which do not break up on stirring. The particular method of introducing the emulsion droplets into the vegetable oil is not critical except that it is necessary to the invention that the droplets be formed in the air or other substantially inert atmosphere prior to their entrance into the vegtable oil.

The vegetable oil containing the beadlets is then chilled at a temperature of from about 0 to about 15° C., preferably about 5° C. for from about 5 minutes to about 16 hours to complete the gelling.

After the beadlets or granules have been gelled by cooling, they can be removed from the suspending mineral or vegetable oil by filtration, centrifuging, or by other suitable means. The residual oil can be washed from the surface of the granules with a suitable solvent, preferably a lower alkanol such as ethanol, isopropyl alcohol, butanol, etc. The small beadlets may then be dried in an atmosphere of suitably low humidity. The beadlets obtained by this procedure are inherently dry and oil-free. It is desirable that this process of drying should be at least partially accomplished by means of suitable water-extracting liquids, such as the lower alkanols, but conducted at a rate such that no strains are set up within the beadlets. These liquids also tend to harden the beadlets and can be added to the cooled oil suspensions of beadlets to assist in "setting" the beadlets and also to assist in their filtration. If the beadlets are dried too rapidly, there is a tendency for them to become case hardened, and often cracking and fragmentation will be encountered. One skilled in the art may readily determine a suitable rate of drying such that the finished product is one of good mechanical strength. This is particularly important when large volumes of the product are to be shipped or stored. Friction and pressure are apt to abrade and to crush the particles, thereby exposing the vitamin contents. A feature of the present invention is that the beadlets containing the vitamin compound dispersed therein possess ample mechanical strength, despite their high vitamin potency.

The beadlets prepared by the process of the invention are almost entirely spheroid in shape of quite uniform size, averaging about 20 mesh to about 125 mesh, generally about 40 mesh to about 80 mesh. The beadlets formed from the droplets of emulsion have approximately the same particle size as the droplets, although some shrinking may occur. The beadlets are particularly resistant to crushing and are quite stable on storage.

It will ordinarily be desirable in practicing the invention to use materials of at least pharmaceutical grade wherever possible.

*Example 1*

25.1 kg. of type A, 6 to 20 mesh, 300-bloom gelatin is added rapidly with stirring to 58.5 liters of distilled water maintained at a temperature of 40° C. The temperature of the mixture is raised rapidly to 55° C. and held at this temperature until solution is completed.

Thereafter a mixture of 11.75 kg. of totally invert sugar and 6.45 kg. of distilled water, heated in the range of 55 to 60° C., is added and the solution mixed at high speed for about 10 minutes. The gelatin solution is agitated and a vitamin A-antioxidant mixture, prepared by mixing together 16.65 kg. of vitamin A palmitate, 1.5 kg. of butylated hydroxy-toluene, and 0.5 kg. of butylated hydroxy-anisol at a temperature of approximately 60° C., is added thereto with mixing. A mixture of 2 kg. of sodium meta bisulfite and 5.0 liters of distilled water is then added. The viscosity of the emulsion is thereafter adjusted to 290 cps.±20 by adding distilled water and measuring the viscosity with a viscometer. The emulsion is then pumped through a spray-head held about 5 inches above the surface of 60 gallons of castor oil, which contains 0.2% butylated hydroxy-toluene and is maintained at a temperature of 21° C.±2° C. After the spraying operation has been completed to form a beadlet slurry in the castor oil, the slurry temperature is lowered to 10° C., and maintained at this temperature for about 30 minutes. Thereafter, 200 gallons of anhydrous ethyl alcohol is added to the slurry with stirring to dehydrate the beadlets. The mixture is then centrifuged and 75 gallons of ethyl alcohol added to the centrifuged beadlets. The alcohol is in turn centrifuged off, and the beadlets dried for one hour at room temperature, and then at 35° C. until dry.

*Example 2*

The process of Example 1 is repeated except that vitamin A acetate is employed and the beadlets are dehydrated and washed with isopropyl alcohol.

*Example 3*

The process of Example 1 is repeated except that vitamin E is employed and the vegetable oil is sesame oil instead of castor oil.

Modifications of the above examples can be made without departing from the scope or spirit of the invention. The examples are given for illustration purposes only and are not intended to limit the invention.

We claim:
1. A process comprising the steps of
   (1) forming an aqueous emulsion containing, dispersed therein, a fat-soluble vitamin-active material and gelatin;
   (2) forming discrete droplets of said emulsion entirely above the surface of a vegetable oil;
   (3) allowing said droplets to fall through an inert atmosphere into said vegetable oil which is maintained at a temperature of from about 15° to about 25° C.;
   (4) cooling the vegetable oil containing the droplets to a temperature of about 0° to about 15° C.; and
   (5) dehydrating the gelatin beadlets formed thereby with a lower alkanol.

2. The process of claim 1 wherein said vegetable oil is castor oil.

3. The process of claim 1 wherein the vegetable oil into which the droplets are introduced is maintained at a temperature in the range of about 18 to about 22° C.

4. A process for preparing gelatin beadlets containing fat-soluble vitamin-active material therein comprising the steps of
   (1) forming an aqueous emulsion of type A gelatin, fat-soluble vitamin-active material, totally invert sugar, a pharmaceutically acceptable water-soluble antioxidant, a pharmaceutically acceptable fat-soluble antioxidant, the dispersed particles in said emulsion having a size substantially in the range of about 0.5 to about 10 microns;
   (2) forming discrete droplets of said emulsion entirely above the surface of a vegetable oil;
   (3) allowing said droplets to fall through an inert atmosphere into said vegetable oil which is maintained at a temperature in the range of about 15° to about 25° C.;
   (4) cooling the vegetable oil containing the droplets to a temperature in the range of about 0 to about 15° C.; and
   (5) dehydrating the solid gelled beadlets formed thereby with a lower alkanol.

5. The process of claim 4 wherein the type A gelatin employed has a bloom in the range of 100 to 300.

6. The process of claim 4 wherein the beadlets are removed from the vegetable oil before being partially dehydrated with a lower alkanol.

7. The process of claim 4 wherein a lower alkanol is added to said cooled vegetable oil prior to separating solid gelled beadlets therefrom.

8. The process of claim 4 wherein the water-soluble antioxidant is sodium meta bisulfite, and the fat-soluble antioxidant is selected from the group consisting of butylated hydroxy-toluene and butylated hydroxy-anisole.

9. The process of claim 4 wherein the vegetable oil is castor oil.

10. The process of claim 4 wherein the vegetable oil is maintained at a temperature in the range of about 18 to about 22° C.

11. The process of claim 4 wherein the fat-soluble vitamin-active material is vitamin A palmitate.

12. The process of forming gelatin beadlets containing vitamin A palmitate, comprising the steps of
   (1) forming an aqueous emulsion of type A gelatin, vitamin A palmitate, totally invert sugar, sodium meta bisulfite, and a butylated hydroxy aromatic antioxidant, the particle size of the dispersed particles in said emulsion having an average size of from 2 to 5 microns;
   (2) forming discrete droplets of said emulsion entirely above the surface of castor oil;
   (3) allowing said droplets to fall through an inert atmosphere into the castor oil which is maintained at a temperature of from about 15 to about 25° C.;
(4) thereafter cooling the vegetable oil to a temperature in the range of 0 to 15° C.;
(5) dehydrating the beadlets formed thereby by contacting them with a lower alkanol.

13. The process of claim 12 wherein the temperature of the castor oil into which the droplets are introduced is maintained at a temperature of from about 18 to about 22° C.

14. A composition of matter comprising a fat-soluble vitamin-active material and type A gelatin.

15. A composition of matter having the physical form of beadlets having an average particle size of from 40 mesh to 80 mesh and comprising a fat-soluble vitamin-active material, type A gelatin, totally invert sugar, a pharmaceutically acceptable water-soluble antioxidant and a pharmaceutically acceptable oil-soluble antioxidant.

16. A composition of matter having the physical form of beadlets having an average particle size of from 40 mesh to 80 mesh and comprising a vitamin A-active material, type A gelatin, totally invert sugar, a bisulfite antioxidant, and a butylated hydroxy aromatic antioxidant.

References Cited in the file of this patent

UNITED STATES PATENTS

| | | |
|---|---|---|
| 1,201,132 | Askenasy | Oct. 10, 1916 |
| 2,572,998 | Eisner | Oct. 30, 1951 |
| 2,691,619 | Bavley et al. | Oct. 12, 1954 |
| 2,980,587 | Ham et al. | Apr. 18, 1961 |
| 2,987,444 | Allardice | June 6, 1961 |
| 3,017,668 | Sundman | Jan. 23, 1962 |

FOREIGN PATENTS

| | | |
|---|---|---|
| 789,844 | Great Britain | Jan. 29, 1958 |

OTHER REFERENCES

Remington's Practice of Pharmacy, 11th edition, 1956, published by the Mack Publishing Co., Easton, Pa., pages 189, 463, 934, and 1030.